United States Patent
Lanham et al.

(10) Patent No.: US 12,215,992 B2
(45) Date of Patent: Feb. 4, 2025

(54) APPARATUS FOR APPLYING A TEMPERATURE FLOW COEFFICIENT IN A VIBRATING FLOWMETER AND RELATED METHOD

(71) Applicant: MICRO MOTION, INC., Boulder, CO (US)

(72) Inventors: Gregory Treat Lanham, Longmont, CO (US); Anthony William Pankratz, Arvada, CO (US)

(73) Assignee: MICRO MOTION, INC., Boulder, CO (US)

( * ) Notice: Subject to any disclaimer, the term of this patent is extended or adjusted under 35 U.S.C. 154(b) by 289 days.

(21) Appl. No.: 17/797,001

(22) PCT Filed: Feb. 10, 2020

(86) PCT No.: PCT/US2020/017529
§ 371 (c)(1),
(2) Date: Aug. 2, 2022

(87) PCT Pub. No.: WO2021/162674
PCT Pub. Date: Aug. 19, 2021

(65) Prior Publication Data
US 2023/0055022 A1     Feb. 23, 2023

(51) Int. Cl.
G01F 25/00 (2022.01)
G01F 1/84 (2006.01)
G01F 25/10 (2022.01)

(52) U.S. Cl.
CPC ............ G01F 1/8436 (2013.01); G01F 25/10 (2022.01)

(58) Field of Classification Search
CPC ....... G01F 1/8436; G01F 25/10; G01F 15/024
USPC ..... 73/1.16, 1.34, 861.354–861.357; 702/33, 702/45, 100
See application file for complete search history.

(56) References Cited

U.S. PATENT DOCUMENTS

| 6,327,915 B1 | 12/2001 | Van Cleve et al. |
| 2008/0234949 A1 | 9/2008 | Stack |

FOREIGN PATENT DOCUMENTS

| WO | 8802853 A1 | 4/1988 |
| WO | 2019045702 A1 | 3/2019 |

OTHER PUBLICATIONS

Isabel M S Lampreia et al: "A new and reliable calibration method for vibrating tube densitometers over wide ranges of temperature and pressure", Journal of Chemical Thermodynamics, Academic Press, London, GB, vol. 43, No. 4, Nov. 8, 2010, pp. 537-545, XP028151643, ISSN: 0021-9614, DOI: 10.1016/J.JCT.2010.11.002 [retrieved on Nov. 20, 2010].

*Primary Examiner* — Robert R Raevis
(74) *Attorney, Agent, or Firm* — The Ollila Law Group LLC

(57) ABSTRACT

A method for calibrating a flowmeter is provided that comprises determining a relationship between tube period ratio and a flow tube temperature compensation (FTC) value for a plurality of flowmeters. Tube periods of the flowmeter under test are measured. A stiffness-correlated FTC is calculated using the determined relationship between the tube period ratio and the FTC value for the plurality of flowmeters and the measured tube periods of the flowmeter under test. The stiffness-correlated FTC is applied to an operating routine (314) of the flowmeter under test.

17 Claims, 8 Drawing Sheets

APPARATUS FOR APPLYING A TEMPERATURE FLOW COEFFICIENT IN A VIBRATING FLOWMETER AND RELATED METHOD

TECHNICAL FIELD

The present invention relates to flowmeters, and more particularly to a method and apparatus for determining and applying temperature flow coefficients to a vibrating flowmeter.

BACKGROUND OF THE INVENTION

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet pathways leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary that the transducer output is very accurate.

Generally, a Coriolis flowmeter can be initially calibrated and a flow calibration factor along with a zero offset can be generated. In use, the flow calibration factor (FCF) can be multiplied by the time delay measured by the pickoffs (ΔT) minus the zero offset (ΔT$_0$) to generate a mass flow rate. Such mass flow calibrations may be represented by two calibration constants, which are equivalent to the slope (FCF) and intercept (zero offset) of a straight line. An example of a mass flow rate equation utilizing a flow calibration factor (FCF) and a zero offset (ΔT$_0$) is described by Equation (1):

$$\dot{m} = FCF(\Delta T_{measured} - \Delta T_0) \qquad (1)$$

Where:
$\dot{m}$ = mass flow rate
FCF = flow calibration factor
$\Delta T_{measured}$ = measured time delay
$\Delta T_0$ = initial zero offset In most situations, the flowmeter is initially calibrated, typically by the manufacturer, and assumed to provide accurate measurements without subsequent calibrations required. Although an initially determined zero offset can adequately correct the measurements in limited circumstances, a multitude of operating conditions may affect the zero offset. Such operating conditions include, but are not limited to, temperature, pressure, fluid density, and sensor mounting conditions.

It is a problem that material properties, cross sectional properties, and the stiffness of a flow tube can change during operation of the Coriolis flow meter. The change in the stiffness of the flow tube can be caused by fluctuations in temperature, for example. Although all flowmeters are sensitive to thermal changes, straight tube meters are inherently more sensitive due to the straight tube being constrained by a rigid structure. This sensitivity can vary from sensor to sensor due to manufacturing variations. These variations differ from meter to meter, and the result is differing tube stiffnesses between meters that directly affect temperature correction terms, and thus require each meter to have unique correction terms applied thereto. Determining the unique correction factors is a time-consuming and expensive process.

Therefore, there is a need in the art for an apparatus and method to determine and apply temperature flow coefficients in a faster and more efficient manner. The present invention overcomes the above difficulties, other problems, and an advance in the art is achieved.

SUMMARY OF THE INVENTION

A method for calibrating a flowmeter under test is provided according to an embodiment. The method comprises the step of determining a relationship between tube period ratio and a flow tube temperature compensation (FTC) value for a plurality of flowmeters. Tube periods of the flowmeter under test are measured. A stiffness-correlated FTC is calculated using the determined relationship between the tube period ratio and the FTC value for the plurality of flowmeters and the measured tube periods of the flowmeter under test. The stiffness-correlated FTC is applied to an operating routine of the flowmeter under test.

A flowmeter is provided according to an embodiment. The flowmeter comprises a meter electronics comprising a processing system and a storage system. A plurality of pickoffs is affixed to a flowmeter conduit in communication with the meter electronics. A driver is affixed to a flowmeter conduit and is in communication with the meter electronics. The meter electronics is configured to apply a stiffness-correlated FTC to an operating routine, wherein the stiffness-correlated FTC is calculated using a predetermined relationship between a tube period ratio and an FTC value for a plurality of flowmeters and measured tube periods of the flowmeter. An operating routine of the meter electronics is configured to apply the stiffness-correlated FTC thereto.

Aspects

According to an aspect, a method for calibrating a flowmeter under test is provided that comprises the step of determining a relationship between tube period ratio and a flow tube temperature compensation (FTC) value for a plurality of flowmeters. Tube periods of the flowmeter under test are measured. A stiffness-correlated FTC is calculated using the determined relationship between the tube period ratio and the FTC value for the plurality of flowmeters and the measured tube periods of the flowmeter under test. The stiffness-correlated FTC is applied to an operating routine of the flowmeter under test.

Preferably, the tube period ratio comprises K values, K1 divided by K2, wherein K1 comprises a tube period of a flowmeter sensor filled with air, and K2 comprises a tube period of a flowmeter sensor filled with water.

Preferably, the relationship between tube period ratio and a flow tube temperature compensation value for a plurality of flowmeters comprises a linear relationship between the tube period ratio and FTC values of a plurality of flowmeters of the same size and model.

Preferably, measuring tube periods of the flowmeter under test comprises measuring tube periods, K1 and K2, wherein K1 comprises a tube period of the flowmeter sensor under test filled with air, and K2 comprises a tube period of the flowmeter sensor under test filled with water.

Preferably, calculating the stiffness-correlated FTC comprises multiplying a slope value derived from the relationship between the tube period ratio and the flow tube temperature compensation value for the plurality of flowmeters by a ratio of K1:K2 of the flowmeter under test.

Preferably, a y-intercept derived from the relationship between the tube period ratio and the flow tube temperature compensation value for the plurality of flowmeters is subtracted from the product of the slope value and the K1:K2 ratio of the flowmeter under test.

Preferably, the step of applying the stiffness-correlated FTC to the operating routine comprises applying the stiffness-correlated FTC to a mass flow routine.

Preferably, the flowmeter under test comprises a straight flow tube.

According to an aspect, a flowmeter is provided that comprises a meter electronics comprising a processing system and a storage system. A plurality of pickoffs is affixed to a flowmeter conduit in communication with the meter electronics. A driver is affixed to a flowmeter conduit and is in communication with the meter electronics. The meter electronics is configured to apply a stiffness-correlated FTC to an operating routine, wherein the stiffness-correlated FTC is calculated using a predetermined relationship between a tube period ratio and an FTC value for a plurality of flowmeters and measured tube periods of the flowmeter. An operating routine of the meter electronics is configured to apply the stiffness-correlated FTC thereto.

Preferably, the stiffness-correlated FTC is calculated using a measured tube period of the flowmeter.

Preferably, the conduit comprises a straight flow tube.

Preferably, the meter electronics is configured to measure a fluid flow of a process fluid therein and to determine at least one fluid characteristic of the process fluid.

Preferably, the tube period ratio comprises K values, K1 divided by K2, wherein K1 comprises a tube period of a flowmeter sensor filled with air, and K2 comprises a tube period of a flowmeter sensor filled with water.

Preferably, the predetermined relationship between tube period ratio and a flow tube temperature compensation value for a plurality of flowmeters comprises a linear relationship between the tube period ratio and FTC values of a plurality of flowmeters of the same size and model.

Preferably, measuring tube periods of the flowmeter comprises measuring tube periods, K1 and K2, wherein K1 comprises a tube period of the flowmeter filled with air, and K2 comprises a tube period of the flowmeter filled with water.

Preferably, calculating the stiffness-correlated FTC comprises multiplying a slope value derived from the relationship between the tube period ratio and the flow tube temperature compensation value for the plurality of flowmeters by a ratio of K1:K2 of the flowmeter.

Preferably, a y-intercept derived from the relationship between the tube period ratio and the flow tube temperature compensation value for the plurality of flowmeters is subtracted from the product of the slope value and the K1:K2 ratio of the flowmeter.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention and will appreciate that the features described below can be combined in various ways to form multiple variations of the invention. As a result, the invention is not limited to the specific examples described below, but only by the claims and their equivalents.

Figure 1:
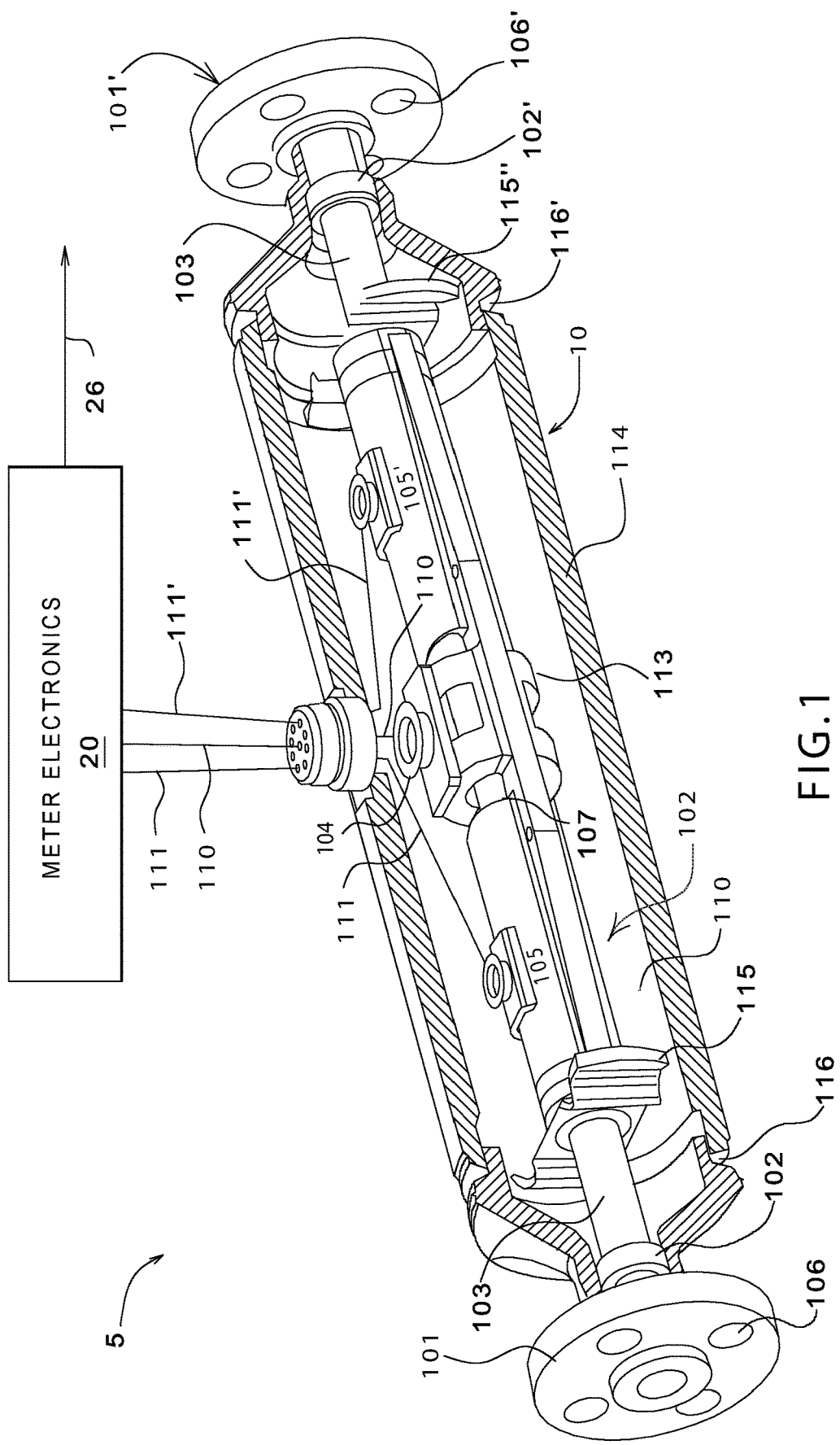
FIG. 1 shows a vibrating sensor assembly according to an embodiment of the invention.

FIG. 1 illustrates an example of a flowmeter 5 in the form of a Coriolis flowmeter comprising a sensor assembly 10 and one or more meter electronics 20. The meter electronics 20 are connected to the sensor assembly 10 to measure a fluid characteristic of a flowing material, such as, for example, density, mass flow rate, volume flow rate, totalized mass flow, temperature, and other information.

The sensor assembly 10 includes a pair of flanges 101 and 101' and a conduit 103. Flanges 101 and 101' of the present example are affixed to spacers 102 and 102'. Spacers 102 and 102' of the present example are affixed to opposite ends of conduit 103. The spacers 102 and 102' maintain the spacing between flanges 101 and 101' and the conduit 103 in the present example to prevent undesired vibrations in the conduit 103. The conduit 103 extends outwardly from the flanges 101, 101'. When the sensor assembly 10 is inserted into a pipeline system (not shown) which carries a flowing material, the material enters the sensor assembly 10 through flange 101, passes into conduit 103, where it exits the sensor assembly 10 through the flange 101'. The flanges 101, 101' may have mounting holes 106, 106' configured to receive a fastener for purposes of installation to the pipeline system. The conduit 103 may, in an embodiment, be affixed to a case 114 via brace bars 115, 115'. In another embodiment, the brace bars 115, 115' are independent of the conduit 103, and may be used to support structures associated with the sensor assembly 10.

The sensor assembly 10 includes a driver 104. The driver 104 is affixed to conduit 103 in a position where the driver 104 can vibrate the conduit 103 in a drive mode. More particularly, the driver 104 includes a first driver component (not shown) affixed to conduit 103 and a second driver component affixed to a structure other than the conduit 103. The driver 104 may comprise one of many well-known arrangements, such as a magnet mounted to the conduit 103 and an opposing coil mounted to a mounting bracket 113, for example. The case 114 may have end caps 116, 116' attached thereto.

In the present example, the drive mode is the first out-of-phase bending mode and the conduit 103 is selected and appropriately mounted to flanges 101 and 101' so as to provide a balanced system having a relatively predictable and/or constant mass distribution, moment of inertia, and elastic modulus about a longitudinal bending axis. In the present example, where the drive mode is the first out of phase bending mode, the conduit 103 is driven by the driver 104. A drive signal in the form of an alternating current can be provided by one or more meter electronics 20, such as for example via pathway 110, and passed through a driver coil to cause conduit 103 to oscillate. Those of ordinary skill in the art will appreciate that other drive modes may be used within the scope of the present embodiments.

The sensor assembly 10 shown includes a pair of pickoffs 105, 105' that are affixed to conduit 103. More particularly, a first pickoff component (not shown) is located on conduit 103 and a second pickoff component is located on a structure independent of the conduit 103. In the embodiment depicted, the pickoffs 105, 105' may be electromagnetic detectors, for example—pickoff magnets and pickoff coils that produce pickoff signals that represent the velocity and position of the conduit 103. For example, the pickoffs 105, 105' may supply pickoff signals to the one or more meter electronics 20 via pathways 111, 111'. Those of ordinary skill in the art will appreciate that the motion of the conduit 103 is proportional to certain characteristics of the flowing material, for example, the mass flow rate and density of the material flowing through the conduits 103.

It should be appreciated that while the sensor assembly 10 described above comprises a single conduit flowmeter, it is well within the scope of the present embodiments to implement a multi-conduit flowmeter. Furthermore, while the flow conduit 103 is shown as comprising a straight flow conduit configuration, the present embodiments may be implemented with a flowmeter comprising a curved/bent flow conduit configuration. It should also be appreciated that the pickoffs 105, 105' can comprise strain gages, optical sensors, laser sensors, or any other sensor type known in the art. Therefore, the particular embodiment of the sensor assembly 10 described above is merely one example and should in no way limit the scope of the present embodiments.

In the example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, and other information. More particularly, the one or more meter electronics 20 receives one or more signals, for example, from pickoffs 105, 105' and, in an embodiment, one or more temperature sensors 107, such as a resistive temperature device (RTD), and use this information to measure a characteristic of a flowing material.

It should be appreciated that while the sensor assembly 10 described above comprises a single conduit flowmeter, it is well within the scope of the present invention to implement a dual conduit or multi-conduit flowmeter. Furthermore, while the flow conduit 103 is shown as comprising a straight conduit, a curved flow conduit configuration is well within the scope of the present invention. Therefore, the particular embodiment of the sensor assembly 10 described above is merely one example and should in no way limit the scope of the present invention.

Figure 2:
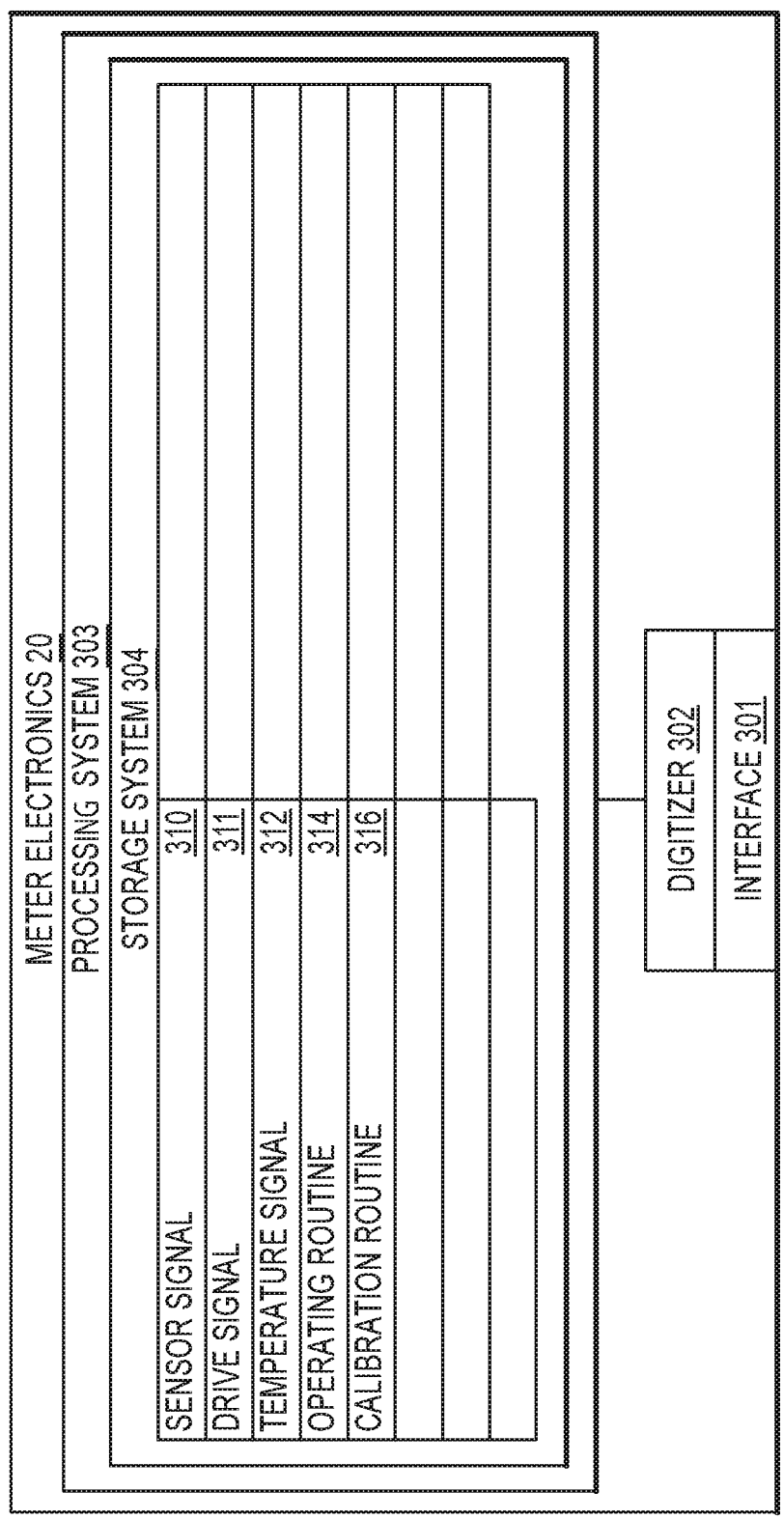
FIG. 2 shows meter electronics according to an embodiment of the invention.

FIG. 2 shows the meter electronics 20 according to an embodiment of the invention. The meter electronics 20 can include an interface 301 and a processing system 303. The processing system 303 may include a storage system 304. The storage system 304 may comprise an internal memory and/or may comprise an external memory. The meter electronics 20 can generate a drive signal 311 and supply the drive signal 311 to the driver 104. In addition, the meter electronics 20 can receive sensor signals 310 from the pickoffs 105, 105', such as pickoff/velocity sensor signals, strain signals, optical signals, or any other signals known in the art. In some embodiments, the sensor signals 310 can be received from the driver 104. The meter electronics 20 can operate as a densitometer or can operate as a mass flowmeter, including operating as a Coriolis flowmeter. It should be appreciated that the meter electronics 20 may also operate as some other type of vibrating sensor assembly and the particular examples provided should not limit the scope of the present invention. The meter electronics 20 can process the sensor signals 310 in order to obtain flow characteristics of the material flowing through the flow conduits 103A, 103B. In some embodiments, the meter electronics 20 may receive a temperature signal 312 from one or more resistive temperature detector (RTD) sensors or other temperature sensors 107, for example.

The interface 301 can receive the sensor signals 310 from the driver 104 or pickoffs 105, 105', via pathways 110, 111, 111'. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 20 and external devices. The interface 301 can be capable of any manner of electronic, optical, or wireless communication.

The interface 301 in one embodiment can include a digitizer 302, wherein the sensor signal comprises an analog sensor signal. The digitizer 302 can sample and digitize the analog sensor signal and produce a digital sensor signal. The digitizer 302 can also perform any needed decimation, wherein the digital sensor signal is decimated in order to reduce the amount of signal processing needed and to reduce the processing time.

The processing system 303 can conduct operations of the meter electronics 20 and process flow measurements from the sensor assembly 10. The processing system 303 can execute one or more processing routines, such as a general operating routine 314 and calibration routine 316, and thereby process inputs in order to produce one or more flow measurements that are accurate under a wide variety of conditions.

As an example of an overview of an embodiment of a calibration routine 316, the system may be calibrated with a factory zero value at no-flow conditions. A user, at any time, may additionally, and optionally, perform a push-button zero. These various zero values are stored in the storage system 304. As part of the operating routine 314, the meter electronics 20 may generate and store values associated with process functions, such as the flow rate of process material, the density of process material, as well as any user-specified settings, such as any post-calibration compensation, for example, without limitation.

Meter electronics 20 inputs/measurements, saved values/constants, user settings, saved tables, etc. may be employed by the calibration routine 316. The calibration routine 316 monitors flowmeter 5 conditions and applies the calibration algorithm deemed most appropriate for the conditions. Conditions may include user-input conditions, for example without limitation. Conditions may also include any combination of temperature, fluid density, flow rate, meter specifications, viscosity, Reynold's number, post calibration compensation, etc. There may be any number of algorithms applied as part of the calibration routine 316. Additionally, besides differing algorithms, different constants, such as a flow calibration factor (FCF), for example without limitation, may be applied to the chosen algorithm based on operating conditions or user preference.

In addition, in the meter electronics 20 according to the invention, the vibrational response is also processed in order to determine a stiffness parameter (K) of the meter assembly 10. Furthermore, the meter electronics 20 can process two or more such vibrational responses, over time, in order to detect a stiffness change (ΔK) in the meter assembly 10. The stiffness determination can be made under flow or no-flow conditions. A no-flow determination may offer the benefit of a reduced noise level in the resulting vibrational response.

The Flow Calibration Factor (FCF) reflects the material properties and cross-sectional properties of the flow tube. A mass flow rate of flow material flowing through the flow meter is determined by multiplying a measured time delay (or phase difference/frequency) by the FCF. The FCF can be related to a stiffness characteristic of the meter assembly. If the stiffness characteristic of the meter assembly changes, then the FCF will also change. Changes in the stiffness of the flow meter therefore will affect the accuracy of the flow measurements generated by the flow meter.

The operating routine may comprise a mass flow routine, such as Equation (1) or Equation (2), below:

$$\dot{M} = FCF*(\delta t_{flow} - \delta t_{zero})*(1 - FT*T_T - FTG*(T_T - T_{avg}))* (1 - FFQ*(\tau_c - K2)) \quad (2)$$

Where:

$$\tau_c = \tau_m*\{1 - DT*T_T - DTG*(T_T - T_{avg})\}^{1/2} \quad (3)$$

Ṁ=Mass flow rate
$T_{avg}$=Average of reference tube and case temperature
$\delta t_{flow}$=Time delay during flow
$\delta t_{zero}$=Time delay during zero flow
FT=Flow tube temperature compensation
FTG=Flow temperature gradient compensation
DT=Density tube temperature compensation
$T_T$=Tube temperature
FFQ=Tube period compensation
K2=High density tube period
DTG=Density gradient temperature compensation
$\tau_m$=Measured tube period The operating routine may comprise a mass flow routine, such as Equation (4), below:

$$\rho = (C_1*\tau_{cp}^2 - C_2)*\{1 + DFQ1*(\tau_{cp} - K2)^2 + DFQ2*(\tau_{cp} - K2)\} \quad (4)$$

Where:

$$C_1 = \frac{D2 - D1}{K2^2 - K1^2} \quad (5)$$

$$C_2 = C_1*K1^2 - D1 \quad (6)$$

$$\tau_{cp} = \tau_{fd}*\{1 - DT*T_T - DTG*(T_T - T_{avg})\}^{1/2} \quad (7)$$

$$\tau_{fd} = \tau_m - F_d*\delta t^2 \quad (8)$$

ρ=Density
$\tau_m$=Measured tube period
$T_T$=Tube temperature
$F_d$=Fluid density compensation
DT=Density tube temperature compensation
$\tau_{fd}$=Mass flow rate compensated tube period
$\tau_{cp}$=Mass flow rate and temperature compensated tube period
DTG=Density gradient temperature compensation
DFQ1/DFQ2=Density linearization factors
$T_{avg}$=Average of reference tube and case temperature
δt=Time delay
D1=Low density fluid density
D2=High density fluid density
K1=Low density tube period
K2=High density tube period The processing system 303 can comprise a general purpose computer, a micro-processing system, a logic circuit, or some other general purpose or customized processing device. The processing system 303 can be distributed among multiple processing devices. The processing system 303 can include any manner of integral or independent electronic storage medium, such as storage system 304.

The processing system 303 processes the sensor signal 310 in order to generate a drive signal, among other things. The drive signal is supplied to the driver 104 via pathway 110 in order to vibrate the associated flow tube(s), such as the conduit 103 of FIG. 1.

It should be understood that the meter electronics 20 may include various other components and functions that are generally known in the art. These additional features are omitted from the description and the figures for the purpose of brevity. Therefore, the present invention should not be limited to the specific embodiments shown and discussed.

Figure 3:
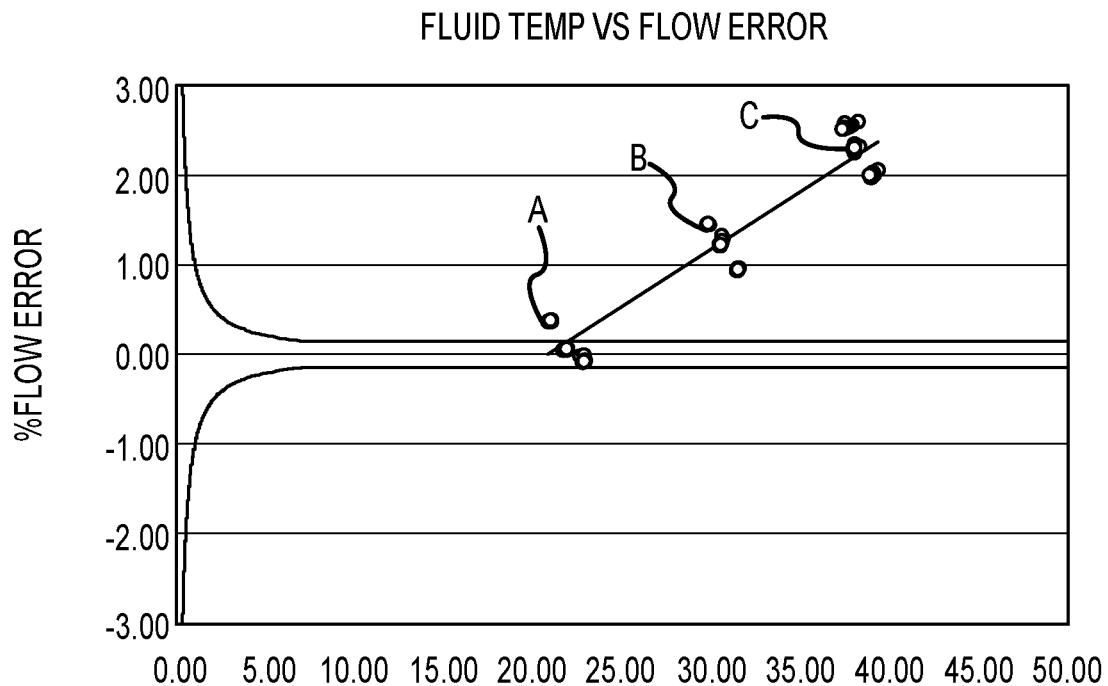
FIG. 3 illustrates temperature-induced error in a flowmeter with no correction factors implemented.

Turning to FIG. 3, the flowmeter 5 was tested at a range of operating temperatures, starting at a flow tube temperature of around 20° C. to about 40° C. No flow-correction or temperature-correction was applied with the meter electronics 20. Multiple measurements were made each at 20° C., 30° C., and 40° C., labelled A, B, and C, respectively. It will be clear that flow error increased drastically as the tube temperature increased.

Figure 4:
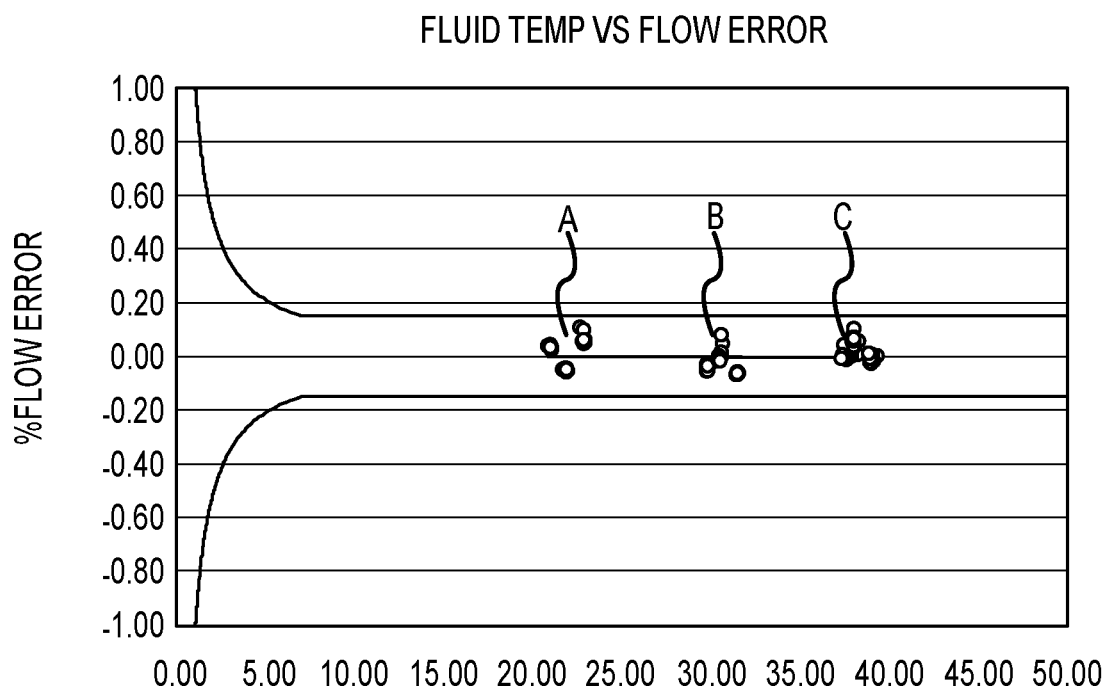
FIG. 4 illustrates temperature-induced error in a flowmeter with custom meter-specific correction factors implemented.

FIG. 4 illustrates that flow error is easily corrected on a meter-by-meter basis, by adjusting FCF, FTC, FTG, and FTQ. This is accomplished on a test bench, and the correction is specific for the meter under test only. The tests necessary and correction calculations employed take many hours to implement, and are simply not practical for manufacturing, as the process is too labor intensive and cost prohibitive.

Figure 5A:
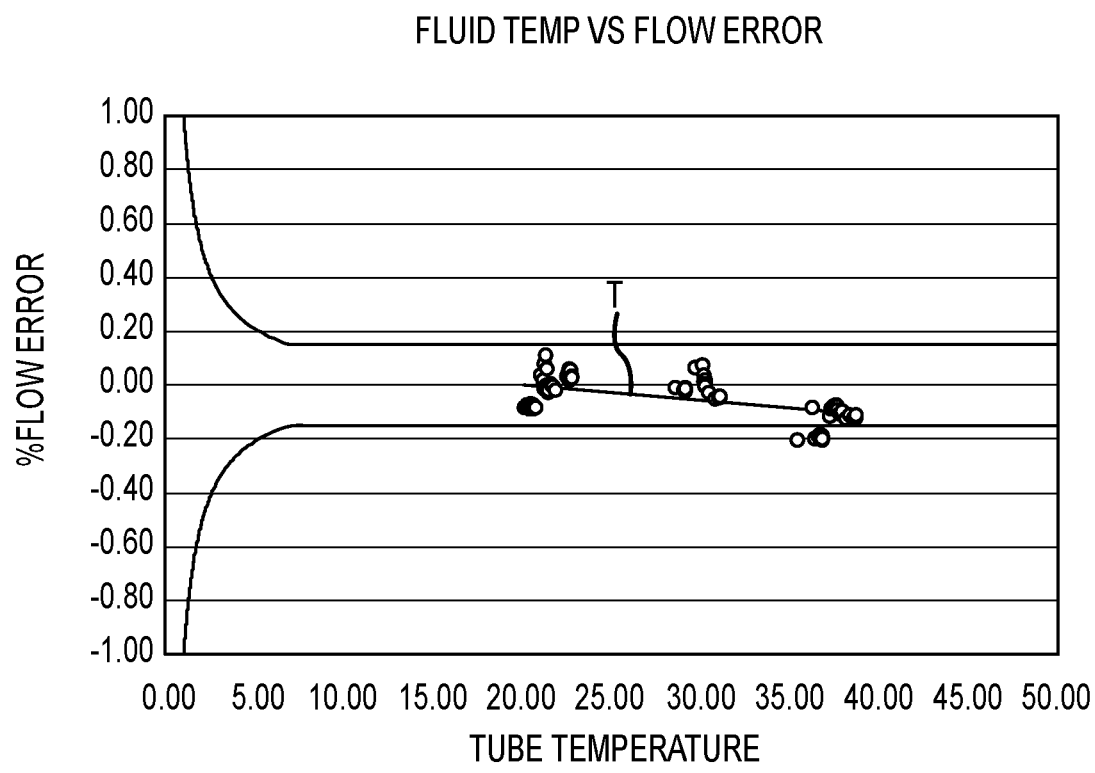
FIG. 5A-5C illustrate temperature-induced error in three flowmeters with global correction factors implemented.
Figure 5B:
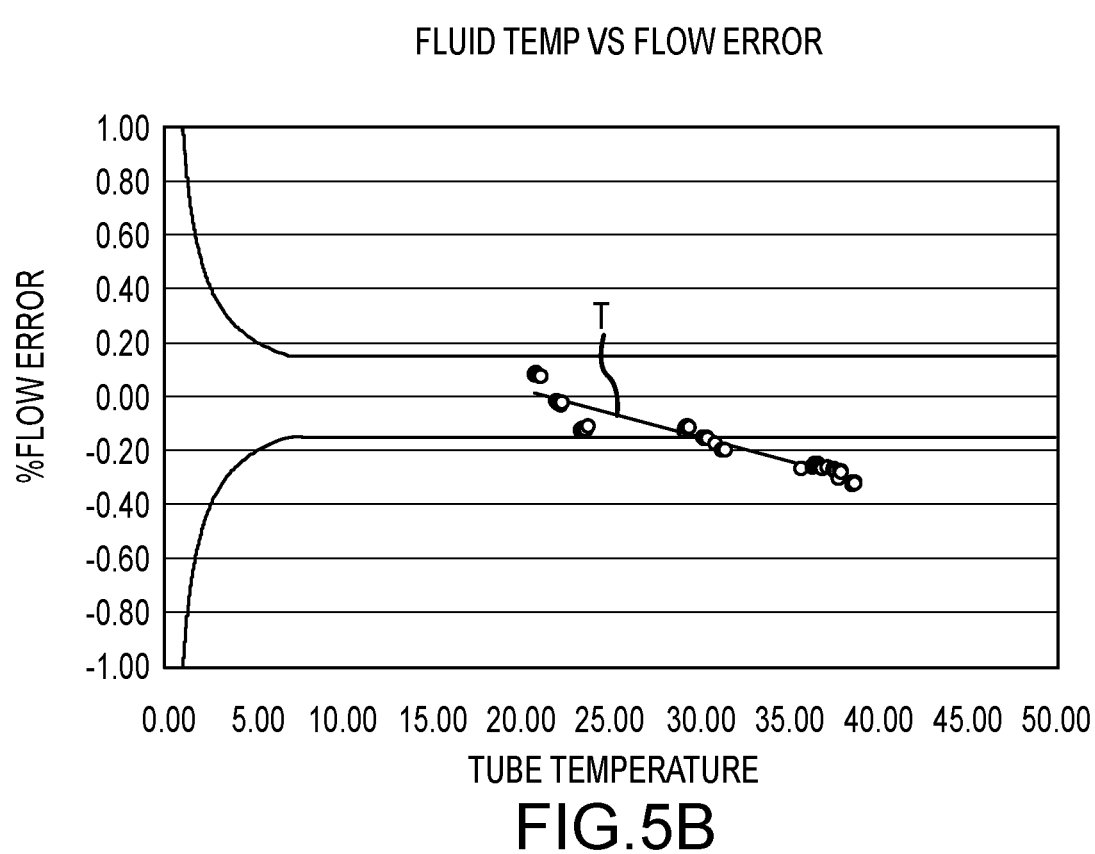
Figure 5C:
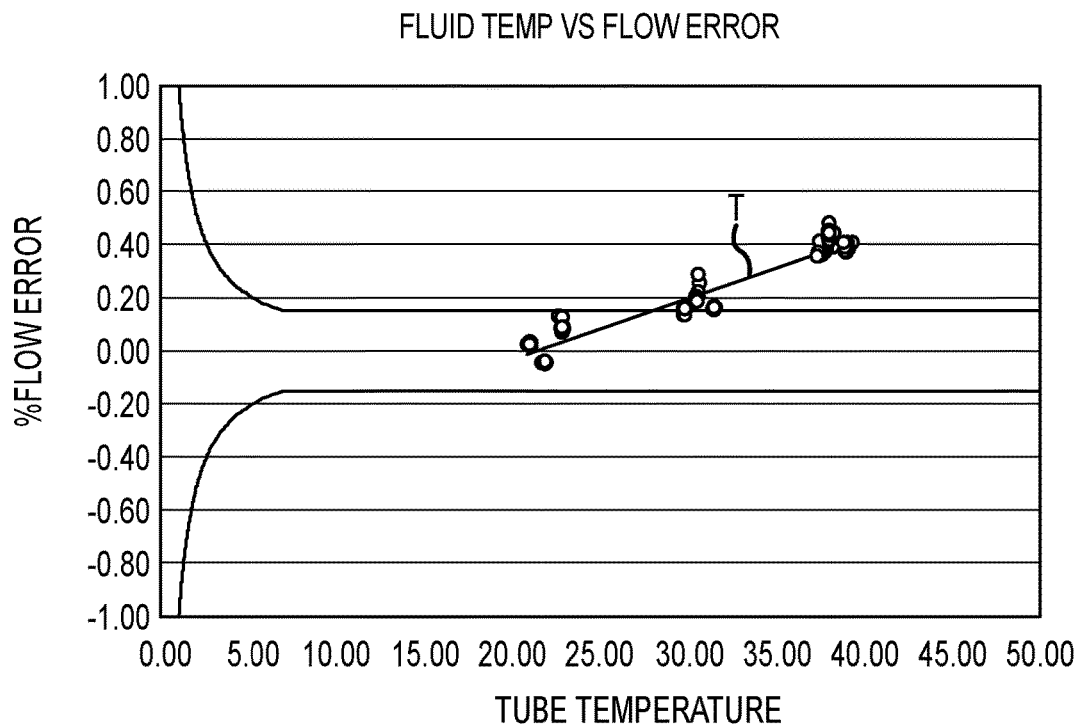

By way of example, averaged global correction factors for FCF, FTC, FTG, and FTQ were applied to three different flowmeters in FIGS. 5A, 5B, and 5C. As noted above, straight tube flowmeters are particularly sensitive to thermal changes, which is due to the straight tube being constrained inside a rigid balance bar that restricts thermal expansion. When the meter changes temperature, the flow tube is either put into compression (higher temperatures) or tension (lower temperatures), thereby changing the stress state, which is in addition to the change in modulus caused by the change in temperature and manufacturing variations. Comparing the trend line (T) in each graph, it will be clear that global correction factors are not an adequate solution, as manufacturing tolerances result in errors that cannot be predicted. For example, the flowmeter illustrated by FIG. 5A has a slightly negatively sloping error trend, and this is far more severe in the flowmeter illustrated by FIG. 5B. Turning to the flowmeter illustrated by FIG. 5C, the error trend slopes in the opposite direction. Such wildly varying error patterns are simply not acceptable for production units, and again it will be clear that global correction factors cannot simply be applied to flowmeters, for the measurement errors are too great and too unpredictable.

Typically, the mass flow equation, Equation 1, is corrected for temperature changes by simply multiplying the FCF by a Flow Tube Temperature Compensation, FTC, (% T Chg/ 100° C.). This works well for a curved tube meter where the effects of thermal expansion are minimal and the FTC term is only correcting for modulus changes. However, with a straight tube meter, the FTC term is attempting to correct the modulus change and the stress state that is set during manufacturing. This stress state can vary from meter to meter and makes using a global FTC inaccurate, as illustrated above.

Figure 6:
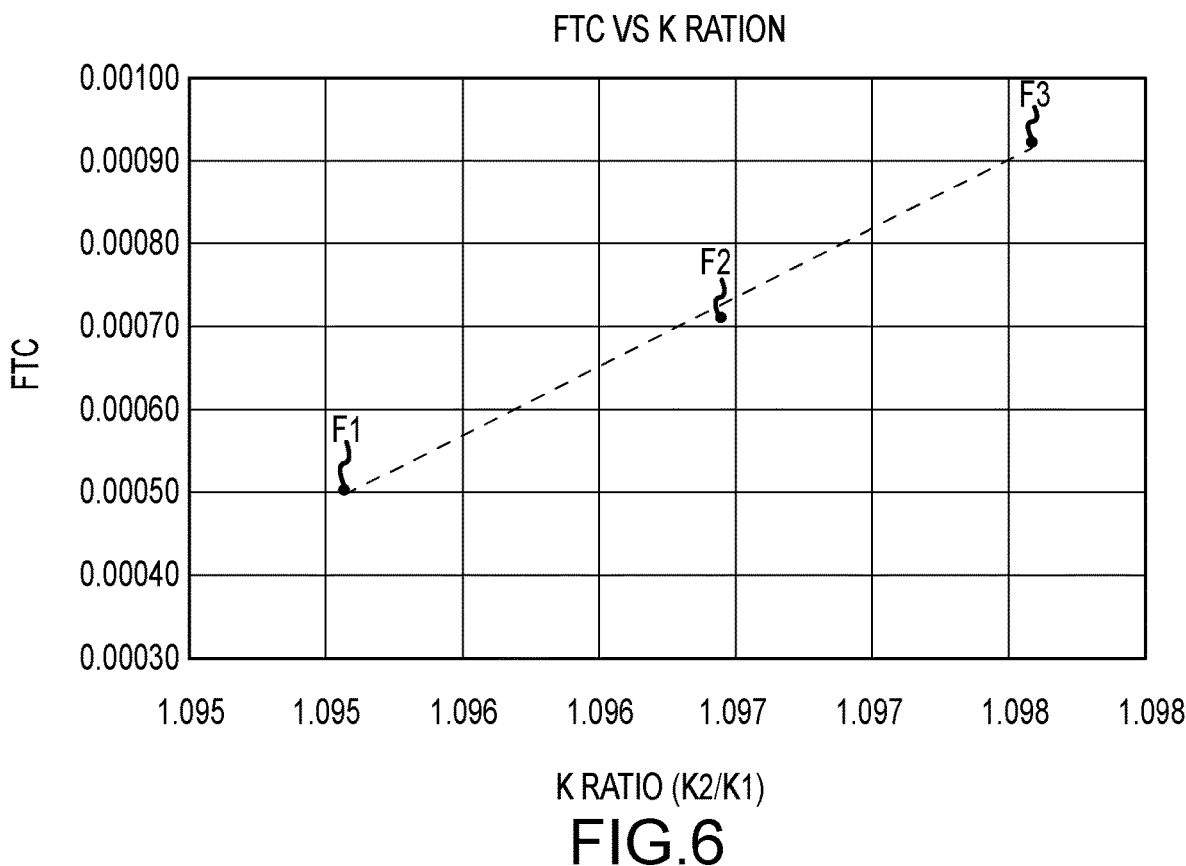
FIG. 6 illustrates an example relationship between tube period ratio and an FTC value.

In an embodiment, several flowmeters of the same size/model were used to determine meter specific FTC values. These FTC values are then correlated with a "stress state" value. In an embodiment, the "stress state" is the ratio of the K values. The K values, K1 and K2, are values determined during a standard calibration process, and comprise the tube period of the sensor filled with air (K1) and water (K2). If the K Ratio (K1 divided by K2) is compared with the meter specific FTC values of the above-referenced "several flowmeters of the same size/model" (the several flowmeters are illustrated as flowmeter 1, F1; flowmeter 2, F2; and flowmeter 3, F3), a linear relationship is determined, as illustrated by FIG. 6.

Using the slope intercept formula derived from FIG. 7, the following may be calculated, by way of example:

$$FTC = 0.1665\left(\frac{K1}{K2}\right) - 0.1818 \quad (9)$$

Relying on Equation 9, a meter-specific FTC value is determined at the point of standard calibration using values that would already be collected during calibration—i.e. K1 and K2. It should be noted that this slope value is merely an example and should in no way limit the embodiments of the invention, as slope, y-intercept, and K values will differ depending on the meter under test and the test conditions. It is also contemplated that other non-linear relationships besides a sloped line may also be utilized. Furthermore, curves that are averaged or fit to a particular motif are also contemplated. Also, instead of formulae, lookup tables stored in meter electronics 20 are also contemplated.

Figure 7A:
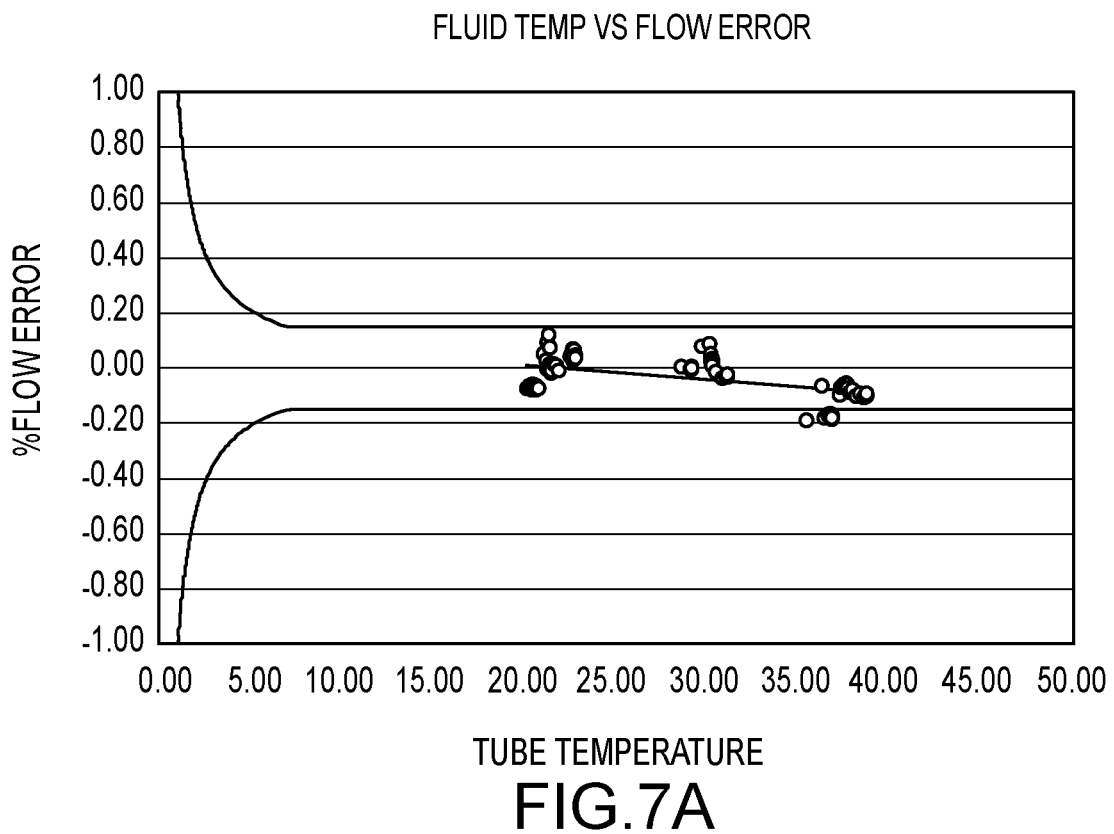
FIG. 7A-7C illustrate temperature-induced error in three flowmeters with period ratio-relationship derived FTC correction factors implemented.
Figure 7B:
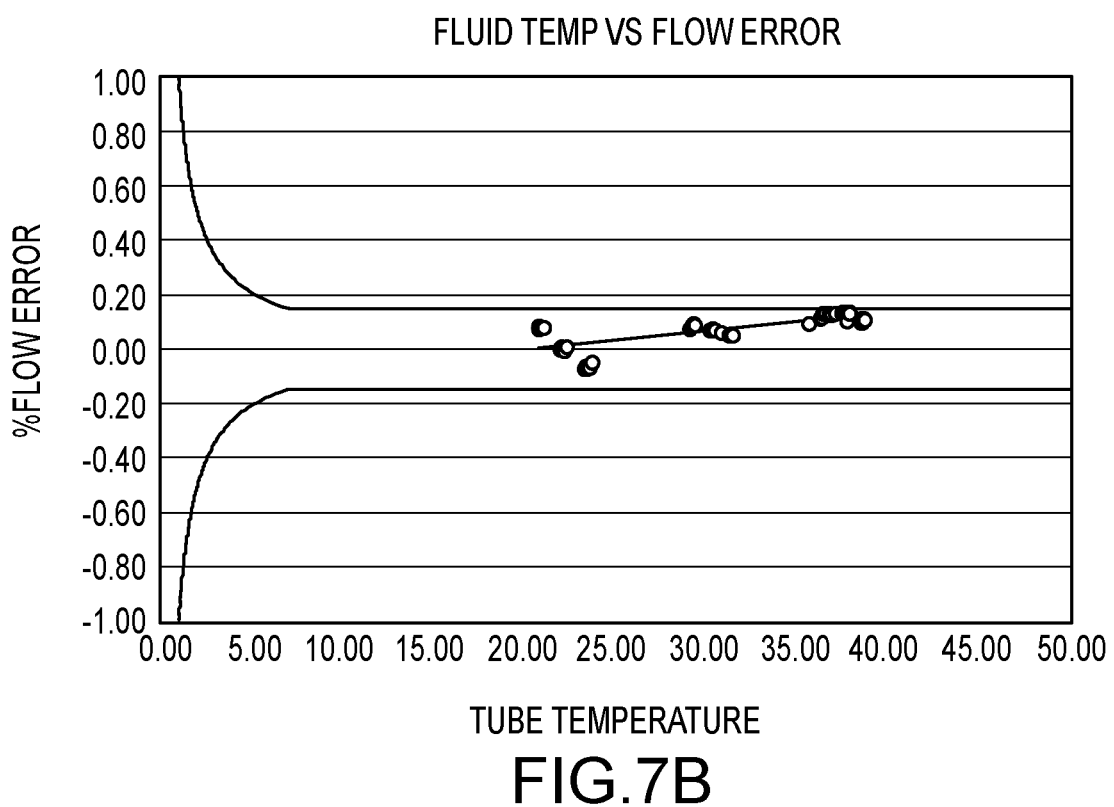
Figure 7C:
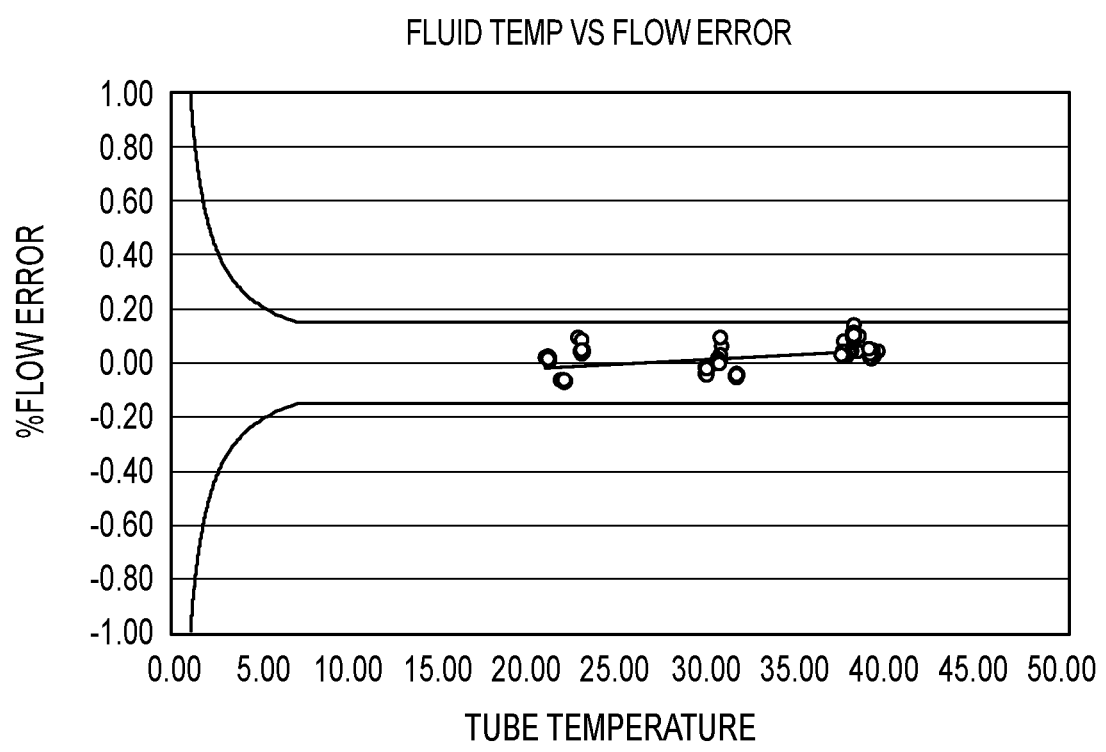

The same three different flowmeters in FIGS. 5A, 5B, and 5C are represented in FIGS. 7A, 7B, and 7C. However, in FIGS. 7A-7C, the stiffness-correlated coefficient, FTC, has been applied to each flowmeter, according to an embodiment. It will be clear that utilizing the stiffness-correlated FTC value results in flow error that is far lower than using a global/average FTC value.

It should also be noted that this method could also be used with curved tubes as well, but the variation between the FTC values would be less than with straight tube meters.

Figure 8:
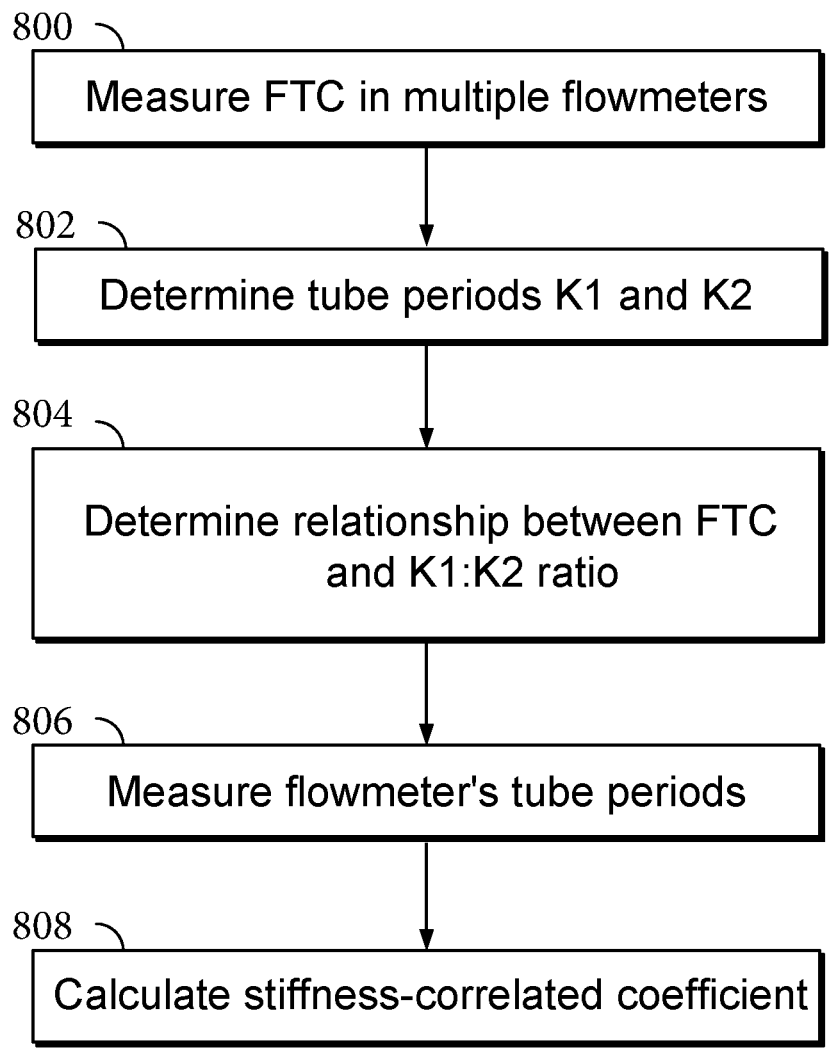
FIG. 8 illustrates a method according to an embodiment.

FIG. 8 is a flow chart that illustrates an embodiment of a method of calibrating a flowmeter. In step 800, the FTC is measured in a plurality of flowmeters of the same model type. In step 802, flowmeter 5 tube periods K1 and K2 are determined for the plurality of flowmeters of the same model type from step 800. These are tube periods measured with air and water in the flow conduit, respectively, as discussed herein.

In step 804, a relationship between the FTC of step 800 and the tube periods of step 802 is determined. In an embodiment, the K1:K2 ratio is correlated with the measured FTC values. As noted above, this correlation is represented by a sloped line. It will be appreciated that other non-linear relationships besides a sloped line, may also be utilized. Furthermore, curves that are fit to a particular motif are also contemplated.

In step 806, a flowmeter's tube periods, K1 and K2, are measured, as part of a calibration process. These tube periods are for the particular flowmeter under test.

In step 808, a stiffness-correlated coefficient, FTC, is calculated using the measured flowmeter tube periods, K1 and K2, and the relationship between previously measured FTC values and previously measured K1:K2 ratios. In an embodiment, an equation having the structure of Equation 9 is utilized to determine the stiffness-correlated coefficient, FTC, from the measured flowmeter tube periods, K1 and K2.

The present invention as described above provides various methods and apparatuses to determine and apply coefficient determination to a vibrating flowmeter, such as a Coriolis flowmeter. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

We claim:

1. A method for calibrating a flowmeter comprising:
determining a relationship between tube period ratio and a flow tube temperature compensation (FTC) value for a plurality of flowmeters;
measuring tube periods of a flowmeter under test;
calculating a stiffness-correlated FTC using the determined relationship between the tube period ratio and the FTC value for the plurality of flowmeters and the measured tube periods of the flowmeter under test;
applying the stiffness-correlated FTC to an operating routine of the flowmeter.

2. The method of claim 1, wherein the tube period ratio comprises K values, K1 divided by K2, wherein K1 comprises a tube period of a flowmeter sensor filled with air, and K2 comprises a tube period of a flowmeter sensor filled with water.

3. The method of claim 1, wherein the relationship between tube period ratio and a flow tube temperature compensation (FTC) value for a plurality of flowmeters comprises a linear relationship between the tube period ratio and FTC values of a plurality of flowmeters of the same size and model.

4. The method of claim 1, wherein measuring tube periods of the flowmeter under test comprises measuring tube periods, K1 and K2, wherein K1 comprises a tube period of the flowmeter sensor under test filled with air, and K2 comprises a tube period of the flowmeter sensor under test filled with water.

5. The method of claim 4, wherein calculating the stiffness-correlated FTC comprises multiplying a slope value derived from the relationship between the tube period ratio and the flow tube temperature compensation (FTC) value for the plurality of flowmeters by a ratio of K1:K2 of the flowmeter under test.

6. The method of claim 5, wherein a y-intercept derived from the relationship between the tube period ratio and the flow tube temperature compensation (FTC) value for the plurality of flowmeters is subtracted from the product of the slope value and the K1:K2 ratio of the flowmeter under test.

7. The method of claim 1, wherein the step of applying the stiffness-correlated FTC to the operating routine comprises applying the stiffness-correlated FTC to a mass flow routine.

8. The method of claim 1, wherein the flowmeter comprises a straight flow tube.

9. A flowmeter (5) comprising:
a meter electronics (20) comprising a processing system (303) and a storage system (304);
a plurality of pickoffs (105, 105') affixed to a flowmeter (5) conduit (103) in communication with the meter electronics (20);
a driver (104) affixed to flowmeter (5) conduit (103) in communication with the meter electronics (20);
wherein the meter electronics (20) is configured to apply a stiffness-correlated FTC to an operating routine (314), wherein the stiffness-correlated FTC is calculated using a predetermined relationship between a tube period ratio and an FTC value for a plurality of flowmeters and measured tube periods of the flowmeter (5); and
an operating routine (314) of the meter electronics (20) is configured to apply the stiffness-correlated FTC thereto.

10. The flowmeter of claim 9, wherein the stiffness-correlated FTC is calculated using a measured tube period of the flowmeter (5).

11. The flowmeter of claim 9, wherein the conduit (103) comprises a straight flow tube.

12. The flowmeter of claim 9, wherein the meter electronics (20) is configured to measure a fluid flow of a process fluid therein and to determine at least one fluid characteristic of the process fluid.

13. The flowmeter of claim 9, wherein the tube period ratio comprises K values, K1 divided by K2, wherein K1 comprises a tube period of a flowmeter sensor filled with air, and K2 comprises a tube period of a flowmeter sensor filled with water.

14. The flowmeter of claim 9, wherein the predetermined relationship between tube period ratio and a flow tube temperature compensation (FTC) value for a plurality of flowmeters comprises a linear relationship between the tube period ratio and FTC values of a plurality of flowmeters of the same size and model.

15. The flowmeter of claim 9, wherein measuring tube periods of the flowmeter (5) comprises measuring tube periods, K1 and K2, wherein K1 comprises a tube period of the flowmeter (5) filled with air, and K2 comprises a tube period of the flowmeter (5) filled with water.

16. The flowmeter of claim 15, wherein calculating the stiffness-correlated FTC comprises multiplying a slope value derived from the relationship between the tube period ratio and the flow tube temperature compensation (FTC) value for the plurality of flowmeters by a ratio of K1:K2 of the flowmeter (5).

17. The flowmeter of claim 16, wherein a y-intercept derived from the relationship between the tube period ratio and the flow tube temperature compensation (FTC) value for the plurality of flowmeters is subtracted from the product of the slope value and the K1:K2 ratio of the flowmeter (5).

* * * * *